United States Patent [19]
Furuoka

[11] 3,810,213
[45] May 7, 1974

[54] SYSTEM FOR TAKING STEREOPHOTOGRAPHS AND STEREOCAMERA BASED THEREON

[75] Inventor: Hideto Furuoka, Tokyo, Japan
[73] Assignee: Gakken Co., Ltd., Tokyo, Japan
[22] Filed: Mar. 14, 1972
[21] Appl. No.: 234,603

[30] Foreign Application Priority Data
Mar. 16, 1971   Japan.............................. 46-14087

[52] U.S. Cl. .........................................354/115
[51] Int. Cl. ............................................ G03b 35/08
[58] Field of Search........................................ 95/18

[56] References Cited
UNITED STATES PATENTS

| | | | |
|---|---|---|---|
| 2,709,401 | 5/1955 | Jaros....................................... | 95/18 |
| 2,804,001 | 8/1957 | Montremy.............................. | 95/18 |
| 2,921,509 | 1/1960 | Freund.................................... | 95/18 |
| 2,767,629 | 10/1956 | Millet...................................... | 95/18 |
| 2,235,743 | 3/1941 | Gagliardi............................... | 95/18 |

*Primary Examiner*—John M. Horan
*Attorney, Agent, or Firm*—Weiner, Basile and Weintraub

[57] ABSTRACT

For photographically recording a pair of laterally displaced images of an object or scene on a film for three-dimensional observation in a stereoscope, a pair of optical systems are provided for optically transmitting the images to their predetermined positions on the film. Each of the optical systems includes a lens and a reflector so arranged that the images are recorded upside down but unreversed as to their rights and lefts. In a stereocamera based on this system, a strip of film is advanced through a predetermined path of travel for recording successive pairs of such laterally displaced images.

1 Claim, 7 Drawing Figures

SYSTEM FOR TAKING STEREOPHOTOGRAPHS AND STEREOCAMERA BASED THEREON

This invention relates to a novel system for taking stereophotographs and to a stereocamera constructed in accordance therewith. A film containing the stereophotographs according to this invention is intended for use with stereoscopes of the type disclosed in U.S. Pat. application Ser. No. 863,570 entitled "A Stereoscope Exhibiting a Panorama-Effect."

BACKGROUND OF THE INVENTION

Stereoscopic images formed on a strip of film by conventional stereocameras or the like are reversed both as to their rights and lefts and their tops and bottoms. For continuously observing the successive objects or scenes, this film strip must be cut into the individual images, and these must then be rearranged and printed on a different film through a lengthy and trouble-some procedure.

In the stereoscope disclosed in the mentioned U. S. application, there are provided a pair of coordinated optical systems, one for each eye of the viewer, for optically transmitting each pair of stereoscopic images of an object or scene to a spatial plane to provide a three-dimensional as well as panoramic view of the object or scene to the viewer. The pair of stereoscopic images are arranged with a lateral spacing on both sides of a center line of a strip of film, and with a longitudinal spacing corresponding to the interpupillary separation of the viewer's eyes, as described later in greater detail with reference to the accompanying drawings. It must be also noted that the photographed object or scene can be stereoscopically seen true to the original only when its images are each recorded on the film upside down but unreversed as to right and left.

SUMMARY OF THE INVENTION

It is an object of the present invention to provide a novel system, and a stereocamera based thereon, for taking stereophotographs such that a pair of stereoscopic images of an object or scene are recorded on a film upside down but unreversed as to their rights and lefts for direct viewing in a stereoscope by a viewer.

Another object of the invention is to provide a simple and inexpensive stereocamera of the class referred to, which makes it possible to take stereophotographs which, upon development, can be directly placed in a stereoscope for continuously obtaining a three-dimensional as well as panoramic view of the objects or scenes.

The present invention provides a system for photographically recording a pair of laterally displaced images of a subject for stereoscopic observation, comprising a film, a first optical system for transmitting a first of the laterally displaced images to the film in such a manner that the first image is formed thereon upside down but unreversed as to its right and left, the first image being positioned on one side of a center line of the film, and a second optical system for transmitting a second of the laterally displaced images to the film in such a manner that the second image is formed thereon upside down but unreversed as to its right and left, the second image being positioned on the other side of the center line of the film longitudinally spaced apart a predetermined distance from the first image.

The invention also provides, in a stereocamera for photographically recording successive pairs of alterally displaced images of subjects for stereoscopic observation, the combination of means for advancing a strip of film through a predetermined path of travel within a casing, a first and a second lens mounted in the front wall of the casing, a first reflector positioned to receive a first of each pair of laterally displaced images of a subject from the first lens and to transmit same to the strip of film, the first image being positioned on one side of a center line of the strip of film, and a second reflector positioned to receive a second of the pair of laterally displaced images from the second lens and to transmit same to the strip of film, the second image being positioned on the other side of the center line of the strip of film longitudinally displaced a predetermined distance with respect to the position of the first image.

DETAILED DESCRIPTION.

Figure 1:
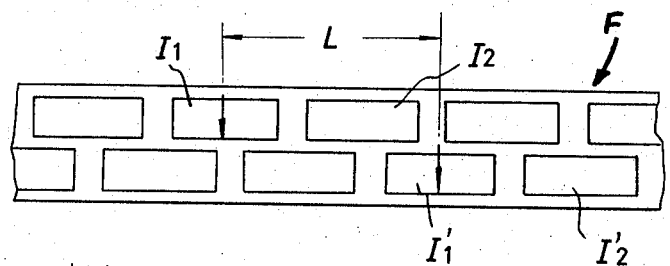
FIG. 1 is a plan view of a film containing stereoscopic images formed according to the present invention.

As illustrated in FIG. 1 of the drawings, a strip of film F prepared according to this invention contains a pair of upside-down images $I_1$ and $I_1'$ of a photographed field to provide a stereoscopic or three-dimensional view of the field. The images are laterally spaced apart on both sides of a center line of the film strip, and are longitudinally spaced apart such that corresponding points thereof have a spacing L approximately equal to the interpupillary separation of the viewer's eyes, as set forth in the aforementioned U.S. Pat. application Ser. No. 863,570. An adjoining pair of images $I_2$ and $I_2'$ of another photographed field are formed correspondingly. All these stereoscopic images must be formed upside down, but unreversed as to their rights and lefts.

Figure 2:
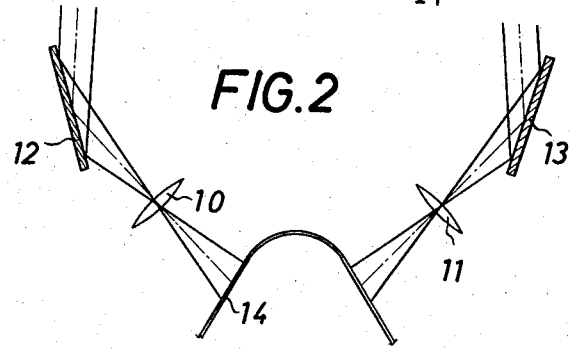
FIG. 2 is a schematic view showing a system for taking stereophotographs according to the invention.

Referring now to FIG. 2 in order to describe a system for photographically recording such a pair of stereoscopic images according to this invention, a pair of lenses 10 and 11 are positioned as illustrated in the drawing. A pair of reflectors 12 and 13 such as, for example, mirrors, are respectively positioned forwardly of the lenses, that is, closer to the object or scene to be photographed. The lens 10 and the reflector 12 form one optical system, and the lens 11 and the reflector 13 another optical system. It may be noted that the reflectors 12 and 13 are, respectively, arranged at such an angle relative to the lenses 10 and 11 as to permit the axes of the light therefrom to pass through the centers of the lenses.

In conformity with the above described positioning of the two optical systems, which are symmetrical, a strip of film 14 is arranged substantially in the form of inverted letter "V" as seen in FIG. 2. Thus, the two laterally displaced images of the object or scene are, respectively, reflected by the reflectors 12 and 13, pass through the lenses 10 and 11, and are formed on the surface of the film 14. The rights and lefts of the images are reversed first by the reflectors 12 and 13 and again by the lenses 10 and 11, so that the images formed on the film are not reversed as to their rights and lefts, but are only turned upside down as they pass through the lenses.

Since corresponding points of the pair of stereoscopic images on the film must be longitudinally or horizontally spaced apart a predetermined distance approximately equal to the interpupillary distance of the viewer's eyes, as previously mentioned with reference to FIG. 1, the two optical systems must be arranged accordingly. It is also necessary that the two optical systems be vertically displaced from each other, to provide the desired lateral or vertical spacing between the pair of stereoscopic images on the film.

Figure 3:
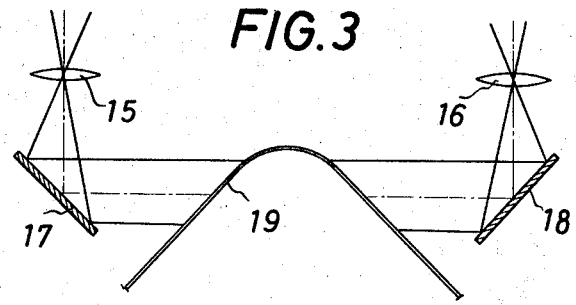
FIG. 3 is a schematic view showing another system for taking stereophotographs according to the invention.

FIG. 3 illustrates another system according to the invention, in which a pair of lenses 15 and 16 are positioned forwardly of a pair of reflectors 17 and 18. As in the preceding system, the lens 15 and the reflector 17 form one optical system, and the lens 16 and the reflector 18 another optical system. The reflectors 17 and 18 are, respectively, arranged at such an angle relative to the lenses 15 and 16 as to properly reflect the laterally displaced images of the object or scene from the lenses onto desired positions on a film 19 substantially in the form of inverted letter "V". The two optical systems must be horizontally as well as vertically spaced apart from each other, as above described in connection with the system of FIG. 2. In this manner, too, the stereoscopic images of the photographed field, which are not reversed as to their rights and lefts but are only turned upside down, can be formed on the film as shown in FIG. 1.

Figure 4:
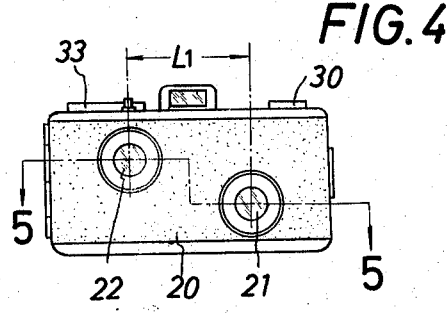
FIG. 4 is a front elevational view of a stereocamera constructed according to the system of FIG. 3.

FIGS. 4 through 7 illustrate a stereocamera constructed in accordance with the above described system of FIG. 3 by way of example, in which a shutter, diaphragm, focusing mechanism, and other usual components of a camera are not shown as these are considered unessential for this invention. As best shown in FIG. 4, a pair of lenses 21 and 22, each of which may be a combination of two or more lens elements, are mounted on the front wall of a casing 20. These lenses are positioned with a horizontal spacing $L_1$ necessary to provide the interpupillary distance of the viewer's eyes between corresponding points of each pair of stereoscopic images on a strip of film as shown in FIG. 1, and with a vertical spacing to form successive pairs of stereoscopic images on both sides of a center line of the film strip.

Figure 5:
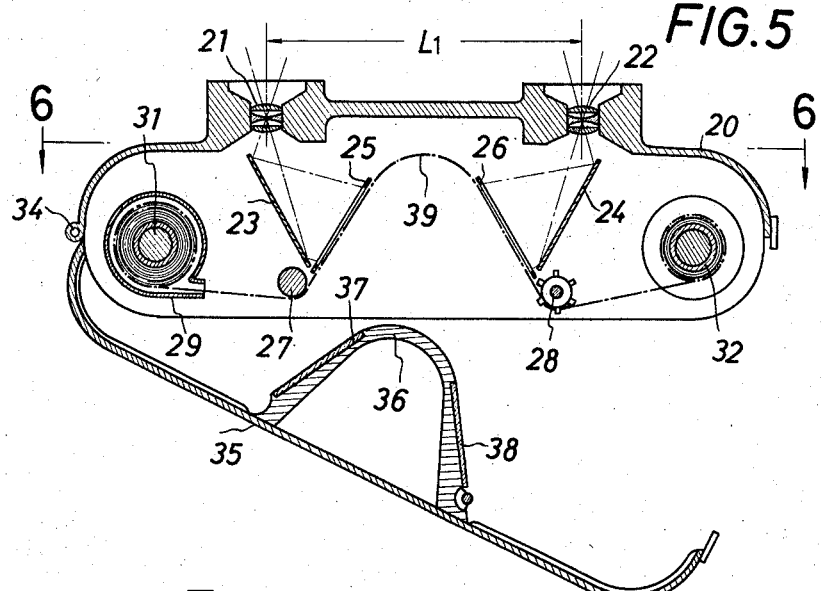
FIG. 5 is a horizontal sectional view taken along the planes of line 5—5 in FIG. 4, with a back cover of the stereocamera partly opened to facilitate the illustration.
Figure 6:
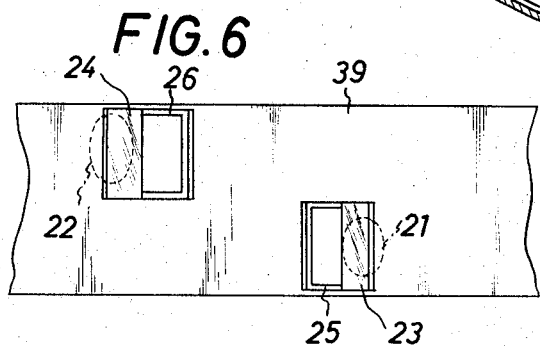
FIG. 6 is a partial, vertical sectional view taken along the plane of line 6—6 in FIG. 5.
Figure 7:
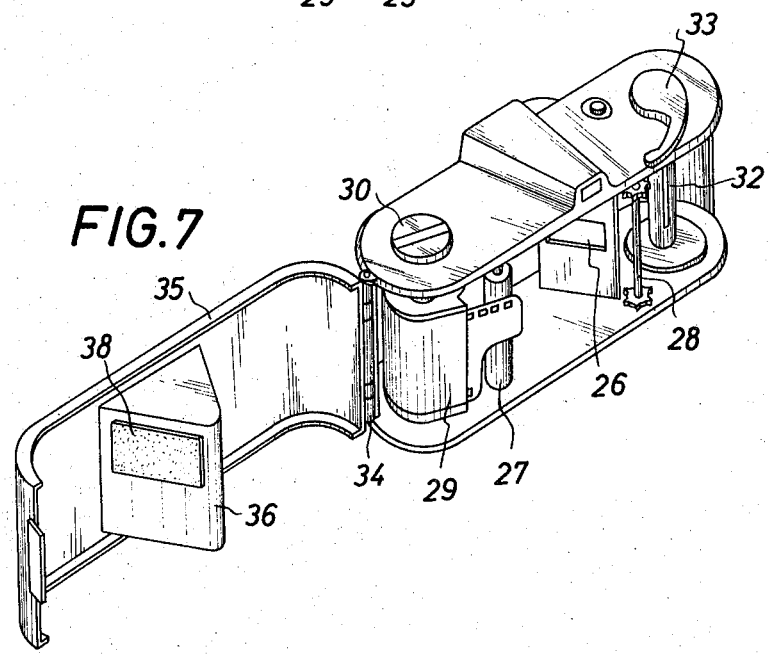
FIG. 7 is a perspective view of the stereocamera with its back cover opened to show the inner details.

Within the casing 20, as shown in both FIGS. 5 and 7, a pair of reflectors such as mirrors 23 and 24 are positioned at a predetermined angle relative to the lenses 21 and 22, respectively. These mirrors must be positioned with horizontal and vertical spacings corresponding to those of the lenses 21 and 22. In order to cause a pair of laterally displaced images of an object or scene reflected by the mirrors 23 and 24 to be formed properly on the desired portions of a strip of film 39, aperture plates 25 and 26 defining vertically spaced-apart apertures therethrough are mounted adjacent the film strip, which is arranged as previously mentioned. (Refer also to FIG. 6).

Further with reference to FIGS. 5 and 7, means for advancing the film strip, including a guide roll 27 and sprocket wheels 28 are provided adjacent the rear ends of the mirrors 23 and 24. The means helps guide the strip of film 39 as the film strip travels through the stereocamera in a manner noted hereinbelow. The teeth on the sprocket wheels 28 are for engagement with the perforations formed along the side edges of the film strip. A cartridge 29 containing a roll of the film strip 39, which may be a dual 35mm film, is supported adjacent one end of the casing 20 by a removable shaft 31 extending through the axial hole of the film cartridge. A manually turnable reel 30, which may be suitably slotted and/or knurled, is formed on the upper end of the shaft 31 extending through the top of the casing. Adjacent the other end of the casing, a winding reel 32 is mounted which is manually turnable by means of a knob 33 of suitable shape on the top of the casing and is releasably engagable with the leading end of the advancing strip of film 39 to advance the film.

An openable back cover 35 may be hingedly coupled to the casing 20 through a pin 34. On the inner surface of the back cover, means, such as, a film guide 36 fixedly mounted is formed centrally for the positioning and guiding of the film strip 39 through a curved path of travel between the shaft and the winding reel. The horizontal section of this film guide is so shaped that when the back cover is closed, the desired path of travel of the film strip, indicated by the dot-and-dash line in FIG. 5, is defined between the film guide and the aforesaid aperture plates 25 and 26, which are then spaced apart just enough to permit the travel of the film strip. The crest of the film guide 36 may be rounded to prevent damage to the film strip, and flat surfaces 37 and 38 of suitable material for contact with the back surface of the film strip to keep the same in position may be formed on those portions of the film guide which correspond to the apertures formed through the aperture plates 25 and 26.

In the exemplified form of the stereocamera of the invention, constructed substantially as hereinbefore described, the laterally displaced images of the object or scene are reversed both as to their rights and lefts and as to their tops and bottoms as they pass through the lenses 21 and 22, respectively. At the mirrors 23 and 24, however, only the rights and lefts of the images are again reversed, or rendered true to the original object or scene. Hence the desired upside-down images that are unreversed as to their rights and lefts are formed on the film strip 39 with the required longitudinal as well as lateral spacings therebetween. A series of such pairs of images may be taken by successive exposures, with the film strip 39 duly advanced through its predetermined path of travel by the manual turn of the knob 33. Upon development this film, which is illustrated in FIG. 1, can be loaded on the stereoscope without any further preparatory measures to provide the three-dimensional as well as panoramic view of the objects or scenes.

Inasmuch as the film strip 39 assumes a curved path of travel, it will readily occur to those skilled in the art that the flat surfaces 37 and 38 formed on the film guide 36 are replacable with an endless belt having a width corresponding to that of the film strip. By turning this endless belt with suitable means, a smoother travel of the film strip will be ensured. For the same purpose, it may also be contemplated to provide a roller at the rounded crest of the film guide 36 for friction-free contact with the back surface of the film strip. All these and other modifications, substitutions, and changes within the usual skill of those in the art are intended in the foregoing disclosure. It is therefore appropriate that the appended claims be construed broadly and in a manner consistent with the fair meaning and the proper scope of the present invention.

I claim:

1. In a stereocamera, the combination of means for advancing a strip of film through a predetermined path of travel with a casing, a first and a second lens mounted in the front wall of said casing with a predetermined horizontal and vertical spacing therebetween, a first reflector positioned to receive a first of a pair of laterally displaced images of a subject from said lens and to transmit same to said strip of film, said first image being positioned on one side of a center line of said strip of film, and a second reflector positioned to receive a second of said pair of laterally displaced images from said second lens to transmit same to said strip of film, said second image being positioned on the other side of said center line of said strip of film longitudinally and vertically displaced a predetermined distance with respect to the position of said first image, a removable shaft adjacent one end of said casing for supporting a cartridge containing said strip of film, said shaft having a manually turnable reel for rewinding said strip of film, a winding reel adjacent the other end of said casing which is releasably engageable with the leading end of said strip of film, said winding reel having a knob for manually advancing said strip of film, means for defining a curved path of travel for said strip of film extending between said shaft and said winding reel, said means including a film guide fixedly mounted on an openable back cover of said casing and said surfaces thereon adapted to keep said strip of film in position by contacting the back surface thereof, a first and a second aperture plate positioned along said curved path of travel and respectively defining a first and a second aperture therethrough, said first reflector being positioned at a predetermined angle with respect to said first lens to receive said first of said pair of laterally displaced images of said subject therefrom and to transmit same to said strip of film through said first aperture, said first image being positioned on one side of said center line of said strip of film and being formed upside down but unreversed as to its right and left, said second reflector being positioned at a predetermined angle with respect to said second lens symmetrically with said first reflector to receive said second of said pair of laterally displaced images therefrom and to transmit same to said strip of film through said second aperture, and said second image being positioned on the other side of said center line of said strip of film longitudinally displaced a predetermined distance with respect to the position of said first image and being formed upside down but unreversed as to its right and left.

* * * * *